(12) United States Patent
Popescu-Stroe et al.

(10) Patent No.: US 11,506,560 B2
(45) Date of Patent: Nov. 22, 2022

(54) APPARATUS, METHOD, AND COMPUTER PROGRAM FOR COMPARING THE OUTPUT OF SENSOR CELLS

(71) Applicant: Infineon Technologies AG, Neubiberg (DE)

(72) Inventors: Victor Popescu-Stroe, Bucharest (RO); Emanuel Stoicescu, Bucharest (RO); Matthias Boehm, Putzbrunn (DE); Constantin Crisu, Bucharest (RO); Uwe Fakesch, Bucharest (RO); Stefan Jahn, Munich (DE); Erhard Landgraf, Dresden (DE); Janis Weidenauer, Mannheim (DE); Bernhard Winkler, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 909 days.

(21) Appl. No.: 16/271,090

(22) Filed: Feb. 8, 2019

(65) Prior Publication Data
US 2019/0250059 A1 Aug. 15, 2019

(30) Foreign Application Priority Data
Feb. 9, 2018 (DE) .......................... 102018102998.5

(51) Int. Cl.
*G01L 19/04* (2006.01)
*G01L 27/00* (2006.01)

(52) U.S. Cl.
CPC ............ *G01L 27/005* (2013.01); *G01L 19/04* (2013.01)

(58) Field of Classification Search
CPC .............................. G01L 27/005; G01L 19/04
See application file for complete search history.

(56) References Cited

U.S. PATENT DOCUMENTS

| 6,441,896 B1* | 8/2002 | Field ..................... G01J 1/4257 356/222 |
| 7,926,353 B2 | 4/2011 | Hammerschmidt |
| 2003/0034456 A1* | 2/2003 | McGregor .............. G01T 1/241 250/370.09 |

(Continued)

FOREIGN PATENT DOCUMENTS

| CN | 101349708 A | 1/2009 |
| CN | 101799269 A | 8/2010 |

(Continued)

*Primary Examiner* — Toan M Le
*Assistant Examiner* — Xiuqin Sun
(74) *Attorney, Agent, or Firm* — Harrity & Harrity, LLP

(57) ABSTRACT

Examples provide for an apparatus, method, and computer program for comparing the output of sensor cells in an arrangement of sensor cells in an area A, including a set of at least two measurement units. A measurement unit includes at least two sensor cells, wherein at least one sensor cell of at least one measurement unit includes a sensitive sensor cell, which is sensitive with respect to a measured quantity. The sensor cells are intermixed with each other. The apparatus further includes means for selecting output signals of sensor cells of the arrangement and means for determining a measured quantity or determining an intact sensor cell by comparing output signals of different measurement units.

25 Claims, 14 Drawing Sheets

(56) References Cited

U.S. PATENT DOCUMENTS

| | | | | |
|---|---|---|---|---|
| 2016/0178397 A1* | 6/2016 | Jost | ............ | G01D 3/08 |
| | | | | 324/252 |
| 2017/0363693 A1 | 12/2017 | Polley et al. | | |
| 2018/0317869 A1* | 11/2018 | Rui | ............ | G21K 1/025 |
| 2019/0316935 A1 | 10/2019 | Jost et al. | | |

FOREIGN PATENT DOCUMENTS

| | | | | |
|---|---|---|---|---|
| CN | 203658561 U | 6/2014 | | |
| CN | 105185655 A | 12/2015 | | |
| CN | 105716632 A | 6/2016 | | |
| CN | 206019678 U | 3/2017 | | |
| DE | 19811044 C1 * | 4/1999 | ............ | G01T 1/2985 |
| DE | 102005039280 A1 | 2/2007 | | |
| DE | 102009055150 A1 | 9/2010 | | |
| DE | 102014119531 A1 | 6/2016 | | |
| DE | 102013021853 B4 * | 6/2017 | ............ | B60W 50/08 |
| WO | 03048953 A2 | 6/2003 | | |

* cited by examiner

APPARATUS, METHOD, AND COMPUTER PROGRAM FOR COMPARING THE OUTPUT OF SENSOR CELLS

RELATED APPLICATION

This application claims priority to German Application No. 102018102998.5 filed Feb. 9, 2018, which is incorporated herein by reference in its entirety.

FIELD

The present disclosure relates to an apparatus, a method, and a machine readable storage or computer program for comparing an output of sensor cells in an arrangement of sensor cells.

BACKGROUND

The present disclosure relates to surface micro-machined sensors in general, and also, more specifically, to improved diagnostics and readouts in side-airbag capacitive pressure sensors.

Automotive safety applications may require a very low defect rate and very good failure detection. Thus, the need for improved diagnostics arises due to increasing functional safety requirements. This creates the need to develop an accurate sensor diagnostic that is capable of detecting a violation of the safety specifications due to single faults. Additionally, an improved diagnostic is needed for the production screening of devices that have only incipient defects on the production line, but which are likely to develop into failures during the lifetime of the device.

Micro-Electro-Mechanical-System (MEMS) devices can have incipient physical defects that become critical in the field and lead to failure of the sensor function. It is critical that they are screened in production, and, when a failure does occur in the field, it must be detected before the sensor function is compromised.

Therefore, the present disclosure addresses two key top level issues: screening in production and detection in the field, which share a common root cause. The proposed solutions address the common root cause, limitations in self-diagnostic capabilities, reduce the failure rate of the devices that end up in the field, and improve the detectability in the field when such failures nevertheless occur.

SUMMARY

Examples relate to an apparatus, method, and a machine readable storage or computer program for comparing the output of sensor cells in an arrangement of sensor cells.

Examples relate to an apparatus for comparing the output of sensor cells in an arrangement of sensor cells in an area A, the apparatus including a set of at least two measurement units; means for selecting output signals of sensor cells of the arrangement; and means for determining a measured quantity or determining an intact sensor cell by comparing output signals of different measurement units. A measurement unit includes at least two sensor cells. At least one sensor cell of at least one measurement unit includes a sensitive sensor cell, which is sensitive with respect to a measured quantity. The sensor cells are intermixed with each other. Such an arrangement may enable the selection of different unit combinations for diagnostic and/or physical quantity measurements.

In some examples, the arrangement of sensor cells may include at least a first cell type which is a reference sensor cell and at least a second cell type which is a sensitive sensor cell. The reference cell has a different sensitivity than the sensitive cell with respect to a measured quantity. By using reference cells in conjunction with sensitive cells, plausibility checks may be enabled.

In some examples, the set of measurement units includes measurement bridges. The measurement bridges may include half-bridge or full-bridge sensor cell type configurations. The sensor cells of the half-bridge configurations may be selected from the group consisting of one reference cell and one sensitive cell, two sensitive cells, and two reference cells. The sensor cells of the full-bridge configurations may include a combination of the sensor cells of two half-bridge configurations. Using a variety of sensor cell type configurations enables the comparison of different relevant measurements, such as a normal or diagnostic readout.

In some examples, the means for selecting output signals of sensor cells of the arrangement may be configured to select at least one segment. A segment may include a subset of the set of measurement bridges of the same sensor cell type configuration. The means for determining a measured quantity or determining an intact sensor cell may be configured to measure the sensor cells using at least one segment. In this way, subsets of cells may be compared with each other or unwanted (or defective) cells may be excluded from the comparison.

In some examples, the means for determining a measured quantity or determining an intact sensor cell may be configured to compare measurements obtained using multiple segments. Whereas the conventional approach only allows for the comparison of two sensor cells, the use of multiple segments allows for the comparison of numerous groupings of cells using the same sensor cell arrangement.

In some examples, a first segment may be a translation, rotation, reflection, or combination thereof of a second segment at a centroid of the configuration.

In some examples, the reflection may be a point, line, or mirror reflection. Examples may allow a high number of different geometrical segment combinations.

In some examples, the means for determining a measured quantity or determining an intact sensor cell may further include comparing output signals of one or more segments to determine information related to a natural drift of the sensor cells of the one or more segments. Determining the natural drift of a segment may aid in identifying the detection of incipient defects.

In some examples, the means for determining a measured quantity or determining an intact sensor cell may further include determining information related to a drift of at least one sensor cell of the arrangement of sensor cells. Determining the natural drift of specific sensor cells aids in identifying the detection of incipient defects.

In some examples, the means for determining a measured quantity or determining an intact sensor cell may further include comparing the information related to the drift to an estimated drift information, and estimating the estimated drift information based on a diagnostic drift measurement. Incipient defects may be detected when the comparison of the estimated drift information to the actual drift information differs.

In some examples, the diagnostic drift measurement may be a calibrated and/or temperature compensated measurement, making the measurements more reliable and/or independent from environmental or other influences.

In some examples, the means for determining a measured quantity or determining an intact sensor cell may further include determining a plurality of intact sensor cells and combining output signals of the plurality of the intact sensor cells to obtain a combined sensor output signal. Thus, defective cells may be ignored, allowing for measurements from intact cells only.

In some examples, the means for selecting output signals of sensor cells of the arrangement may further include, after the plurality of intact sensor cells has been determined, deselecting a sensor cell from the plurality of intact sensor cells or deselecting a measurement unit containing the sensor cell from the set of measurement units, if comparing the output signal of the sensor cell indicates the sensor cell to be defective. Thus, if a cell becomes defective after the original selection has occurred, it is possible to deselect said defective cells and measure only the remaining intact cells.

In some examples, the means for selecting output signals of sensor cells of the arrangement may further include selecting spare sensor cells to replace any deselected sensor cells. Thus, a defective cell may be replaced to retain consistency in the sensor cell type configurations of the measurement units.

In some examples, the means for selecting output signals of sensor cells of the arrangement may further include selecting spare measurement units to replace any deselected measurement units. Thus, a measurement unit containing a defective cell may be replaced to retain consistency in the chosen segments.

Some examples may further include a metal mesh in the spaces between the sensor cells. The metal mesh may dissipate charges, preventing or reducing ESD or other electrical discharges from affecting the sensor cells.

In some examples, the distance between the centroids of at least two intermixed sensor cells may be less than 0.25*square root of A. By keeping the distance between sensor elements small, environmental or other external influences across different sensor cells may be homogenized.

In some examples, a gap between the at least two sensor cells may be less than the largest dimension of the sensor cells, enabling sensor cells to be tightly packed on a substrate and/or independent of external influences across the die.

In some examples, a gap between the at least two sensor cells may be less than 50 microns.

Examples relate to a method for comparing the output of sensor cells in an arrangement of sensor cells in an area A, including a set of at least two measurement units, wherein a measurement unit includes at least two sensor cells, wherein at least one sensor cell includes a sensitive sensor cell, which is sensitive with respect to a measured quantity, wherein the sensor cells are intermixed with each other. The method includes selecting output signals of sensor cells of the arrangement and determining a measured quantity or determining an intact sensor cell by comparing output signals of different measurement units.

Examples relate to a computer program having a program code to perform the above-mentioned method when the computer program is executed on a processor, a computer, or programmable hardware.

BRIEF DESCRIPTION OF THE DRAWINGS

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
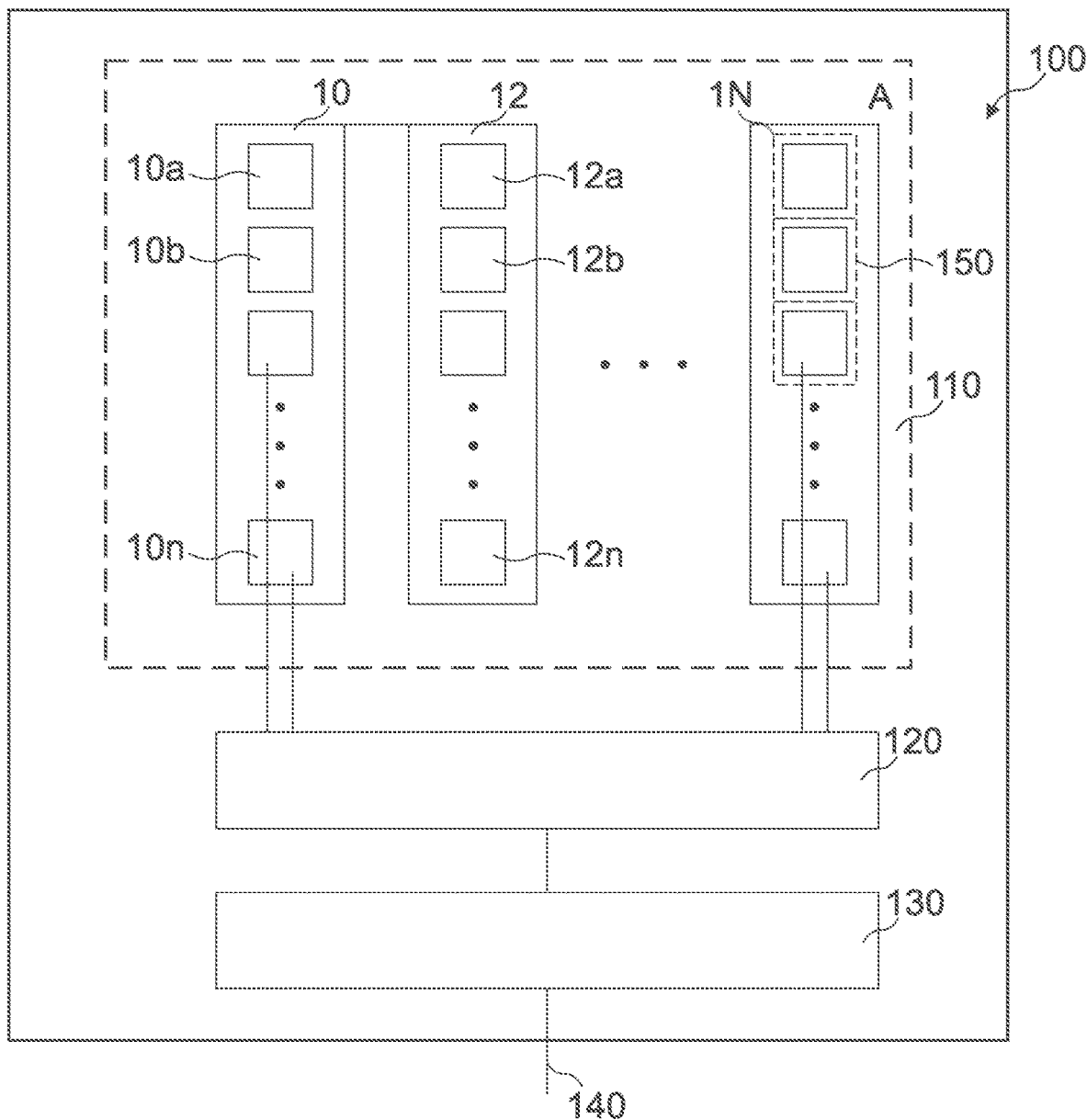
FIG. 1 shows an apparatus for comparing the output of sensor cells.

FIG. 1 shows an apparatus for comparing the output signals of sensor cells. The apparatus 100 comprises a set 110 of at least two measurement units 10, 12, . . . 1N. Each measurement unit comprises at least two sensor cells 10a, 10b, . . . 10n; 12a, 12b, . . . 12n. At least one sensor cell of at least one measurement unit comprises a sensitive sensor cell. A measurement unit may be any combination or connection of sensor cells, such as a full bridge of 4 elements, a half bridge of 2 elements, or two or more sensor cells which are not electrically connected together but whose measurements are taken synchronously. It should be appreciated that any configuration of sensor cells capable of providing a measurement may be used as a measurement unit; the aforementioned list is not intended to be exhaustive.

The sensor cells may be of at least two types and at least two (or more) groupings. Sensor cells which are sensitive to the measured quantity (such as pressure, temperature, humidity, piezoresistivity, or other sensing principles) shall be referred to as "sensitive sensor cells" or "sensitive cells" and labelled with the letter S. Reference sensor cells, which are insensitive (or substantially less sensitive) to the measured quantity shall be referred to as "reference sensor cells" or "reference cells" and labelled with the letter R. Thus, sensitive cells or groupings of sensitive cells may be referred to as S1, S2, etc. and reference cells or groupings of reference cells may be referred to as R1, R2, etc.

Figure 7:
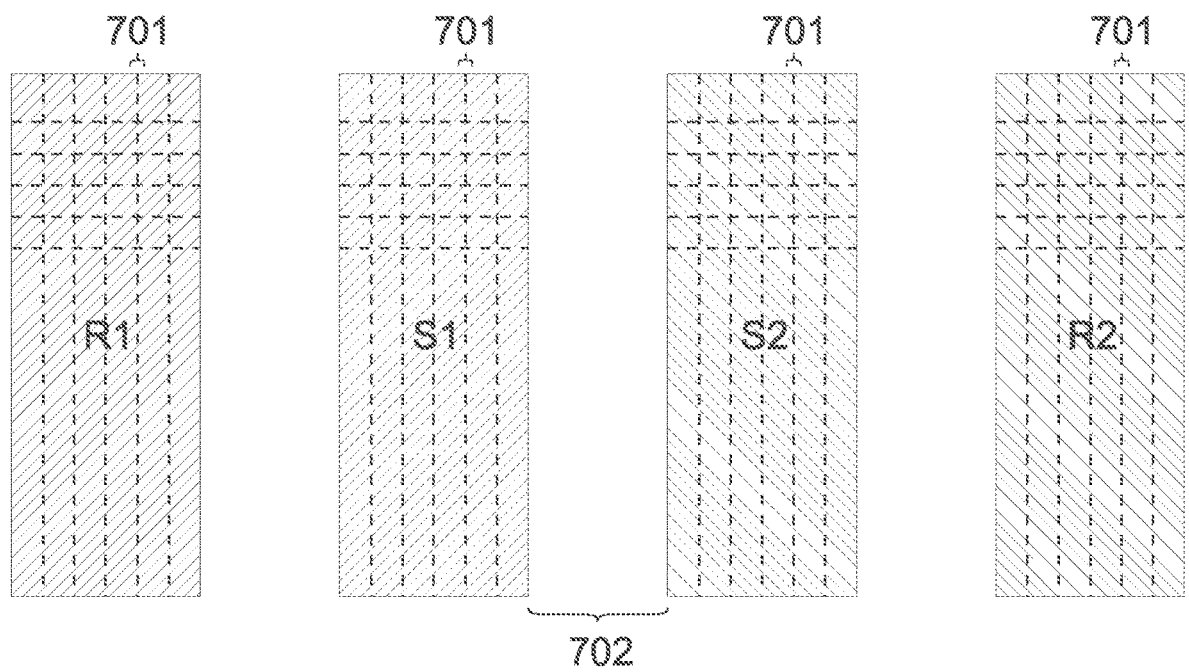
FIG. 7 shows a conventional layout of sensitive and reference cells.
Figure 9:
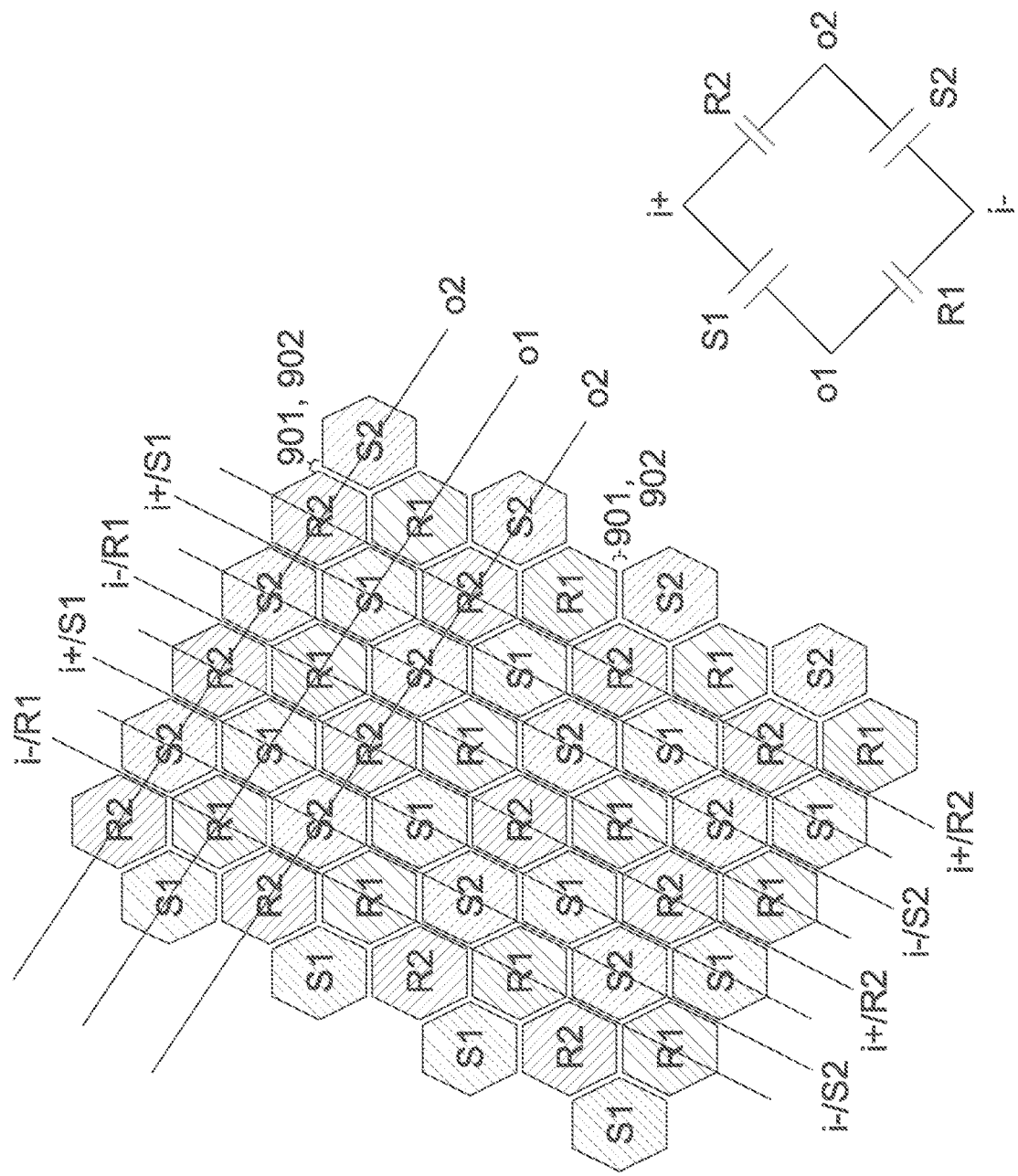
FIG. 9 shows an example of intermixing in a hexagonal arrangement.
Figure 8:
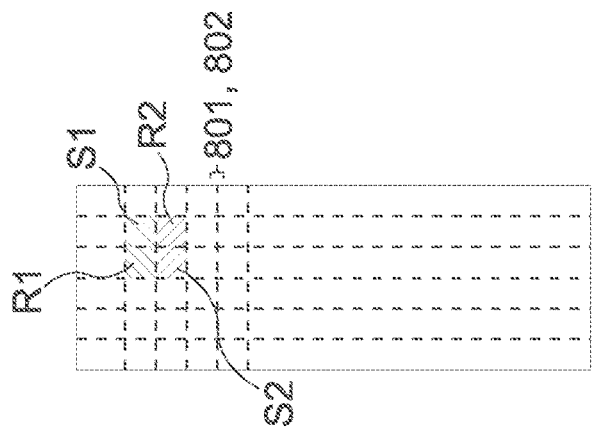
FIG. 8 shows an example of intermixing in a rectangular arrangement.

The sensor cells are intermixed with each other. As used herein, intermixed means that the arrangement of sensor cells comprises a mixture of different sensor cells or groupings of sensor cells in contrast to the conventional approach. Individual sensor cells of a first type and/or group may be located next to individual sensors of other types and/or groups rather than placing sensor cells of the same type and/or group together. For example, compare the conventional arrangement of independent sets of the same sensor cell type/group as shown in FIG. 7 with the intermixed arrangement wherein sensor cells of different groups and/or types are located within the same set as shown in FIGS. 8 and 9. Intermixing is explained in more detail in relation to FIGS. 4 and 7-11.

The apparatus 100 includes a means for 120 selecting output signals of sensor cells of the arrangement. The means for 120 selecting output signals of sensor cells of the arrangement may be coupled, directly or indirectly, to the sensor cells (or each sensor cell) of the arrangement of sensor cells. The means for selecting output signals may include any device capable of selecting the desired signals of one or several sensor cells, such as a multiplexer, data selector, matrix switch, transistor set, or any switch or circuit (or their equivalents) capable of selecting one, some, or all of the sensor cells of the arrangement as desired and explained in more detail throughout this disclosure.

The apparatus 100 also includes a means for 130 determining a measured quantity or determining an intact sensor cell (i.e., a non-defective cell) by comparing output signals of different measurement units. The means for 130 determining a measured quantity or determining an intact sensor cell may be coupled, directly or indirectly, to the means for 120 selecting output signals of sensor cells. The means for determining a measured quantity or intact sensor cell may be a processor, FPGA (Field Programmable Gate Array), ASIC (Application Specific Integrated Circuit), or any set of programmable logic blocks or equivalents capable of comparing the selected output signals. In other words, the means for 120 may select one, some, or all sensor cells in varying configurations and the means for 130 may then compare and process the signals of the selected sensor cell(s).

This may be repeated to find a number of intact sensor cells. Thus, the means for 130 determining an intact sensor cell may further determine a plurality of intact sensor cells and may then combine output signals of the plurality of the intact sensor cells to obtain a combined sensor output signal 140.

Minimally, a single sensing MEMS device or sensor device is used to sense the desired physical quantity. Diagnostics are enabled by providing two identical sensor structures instead of a single one. These two identical sensors can both be used to sense the physical quantity (referred herein as the "normal readout"). For the sensor diagnostic, the difference in the output of the two identical structures can be evaluated (referred herein as the "diagnostic readout").

Figure 2:
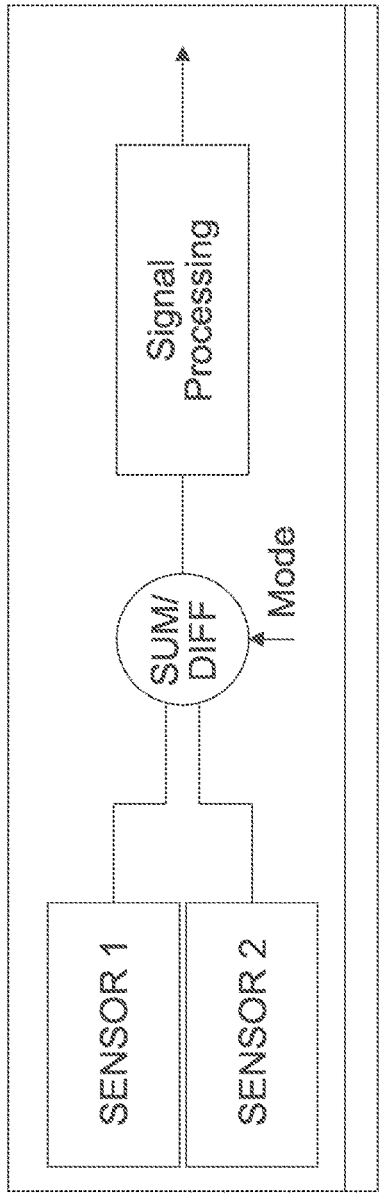
FIG. 2 shows a conventional arrangement of sensor cells.

FIG. 2 illustrates conventional diagnostics using two identical sensors. If a defect occurs on only one of these identical structures, causing a change only in its output, then the difference between the output of the first and second sensor increases, and the defect can be detected. The raw uncalibrated difference between the sensors is monitored to detect single point failures (i.e. in only one of the MEMS devices).

However, such a difference between the two sensors may actually be due to process and layout variations across the MEMS area. Since these sensors typically occupy a large silicon area, environmental and physical factors may influence the two identical sensors in different ways, causing or creating a mismatch (a difference) between their readouts. Such mismatches may be large and may have a variation with the measured physical quantity, and/or with temperature or other physical quantities. On top of this, these mismatches vary during the lifetime of the sensor. For example, if a mismatch is sensitive to mechanical stress and the mechanical stress conditions change over time, then the mismatch will also be time-dependent.

In the field, this increases the difficulty in determining if the safety specification of the sensor has been violated because the effects described above significantly degrade the correlation between the output of the diagnostic readout and the normal sensor readout. Without these degrading factors, this correlation would allow for the prediction of a normal readout error increase based on a change in the diagnostic readout.

There are two primary reasons for this difficulty: (1) a variation in the diagnostic readout does not correspond predictably to a variation in the normal readout (conversion factor has a large spread); and (2) a large margin for the diagnostic test limits has to be added to account for such effects.

In addition, of particular concern is the detection of incipient defects in the production line screening. Since these defects are not fully developed, they are obscured by the mismatch between the two sensors.

The limitation in diagnostic capability originates from the "natural" drifts of the devices. These represent drifts that affect, to a certain extent, all devices. They are not due to local defects in the device and, more importantly, do not necessarily correspond to the failure of the device to satisfy the requirements (since such drifts affect all devices and are monitored in the qualification).

The in-the-field failure rate is controlled through a screening test in production. In this test, the device drift during a given screening stress is monitored. The point is to detect incipient defects, since a defect develops progressively during lifetime. The intent is to detect even those defects that are not advanced enough to cause serious issues at 0 hours (i.e. on the production line) but can cause failures in the field.

Figure 3:
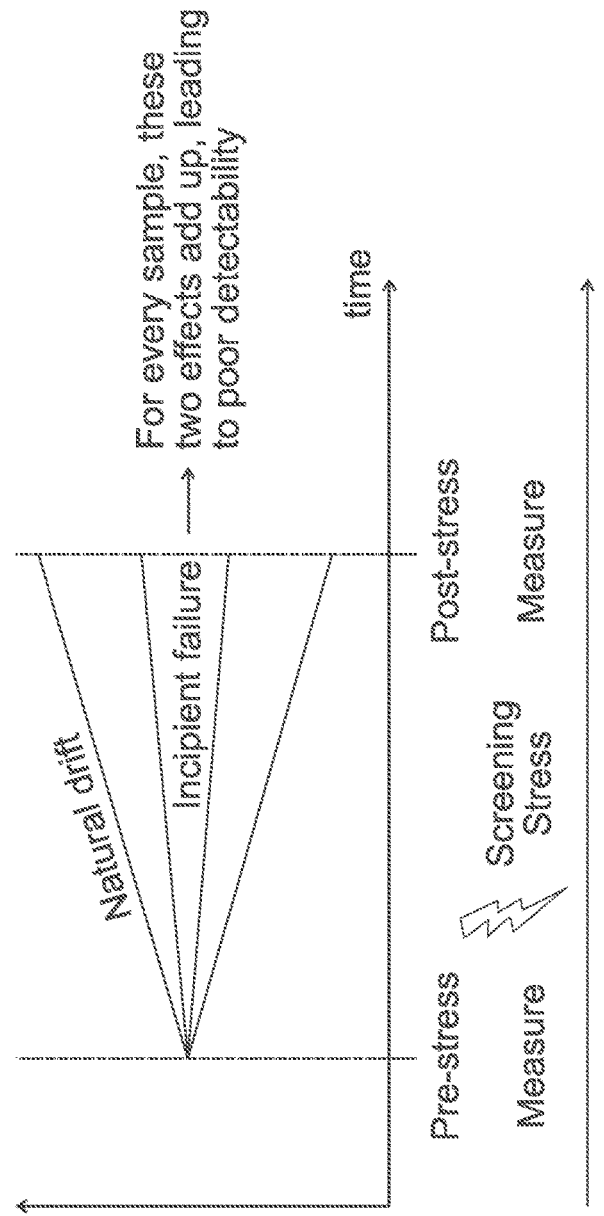
FIG. 3 shows the evolution of natural drift and incipient failures during a stress test.

FIG. 3 illustrates the drift spread of the diagnostic readout for a population of devices subjected to a screening stress (e.g. high temperature). Each device will drift naturally away from its initial readout once stress is induced. During the diagnostic of the sensor, the detection of the incipient failures is obscured by these natural drifts. These are due to layout/processing mismatches which amplify with lifetime stress.

As can be seen in FIG. 3, these natural drifts or dependencies obscure the small effect of an incipient defect, reducing detectability. If the diagnostic readout is dependent on temperature and the sensed quantity, then detectability is reduced. Similarly, sensitivity to changes in mechanical stress conditions (creep) may also reduce screening effectiveness.

A possible improvement to the conventional approach may be made by using an intermixed arrangement of sensor cells rather than only two large ones. The sensor cells may be arranged based on two general properties: electrical and physical arrangement.

Figure 4:
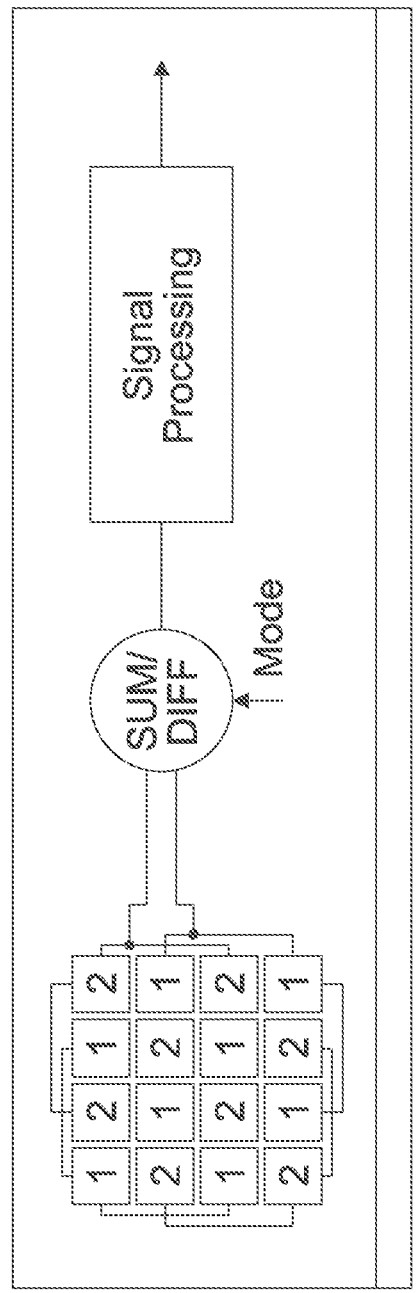
FIG. 4 shows a generalized approach to intermixing sensor cells.

FIG. 4 shows the generalized concept of intermixing. Instead of using two large sensors, a set of smaller sensors which are connected and controlled together are used. The connectivity is set up in such a way that the sensors are split into two groups of sensors (group 1 and 2), each group corresponding to one of the two sensors used in the conventional approach as illustrated in FIG. 2. The individual sensors of the two sensor groups are intermixed with each other, with a common centroid layout. It should be noted that although FIG. 4 illustrates only two sensor groups, any number of sensor groupings may be used. As will be described later, by using two groups of sensitive sensor cells and two groups of reference (i.e. insensitive) sensor cells, multiple measurement configurations may be enabled.

Using this approach provides several advantages over the conventional arrangement:
  a) Using a set of smaller sensors allows a better layout to reduce mismatches between the structures, which reduces the dependency of the diagnostic readout (which measures mismatch) on the sensed physical quantity and on temperature. This allows better "visibility" of deviations due to sensor defects.
  b) Mechanical stress sensitivity of the two sensor groups is better correlated due to smaller geometrical distances between corresponding elements in the two groups. This leads to a reduced drift of the diagnostic readout during the screening stress (and in the field, during lifetime), which allows for better "visibility" of drifts that are due to a progressive defect.
  c) This new layout allows the MEMS to be furnished with a dense metal mesh in the spaces in between the MEMS elements. As will be described later, this allows protection against external electrical coupling such as powered ESD pulses.

Figure 5C:
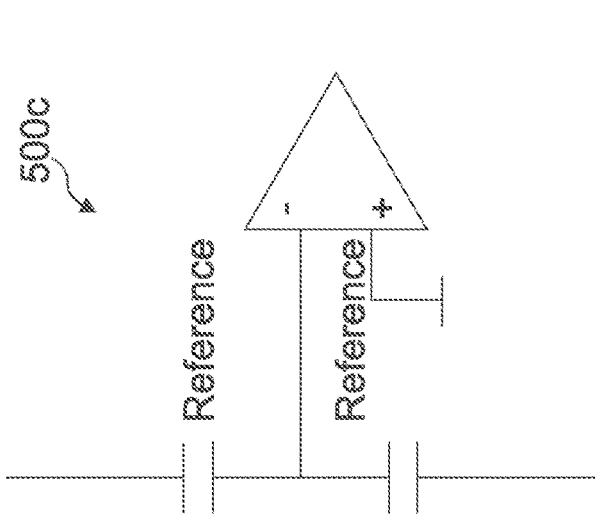
FIG. 5C shows a half-bridge configuration for a reference cell diagnostic mode.
Figure 5B:
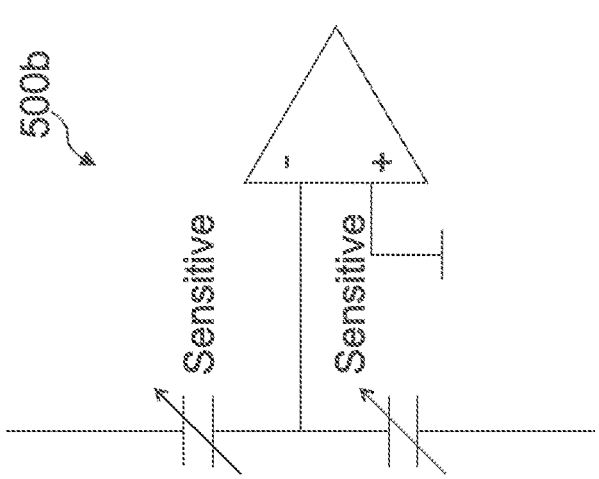
FIG. 5B shows a half-bridge configuration for a sensitive sensor cell diagnostic mode.
Figure 5A:
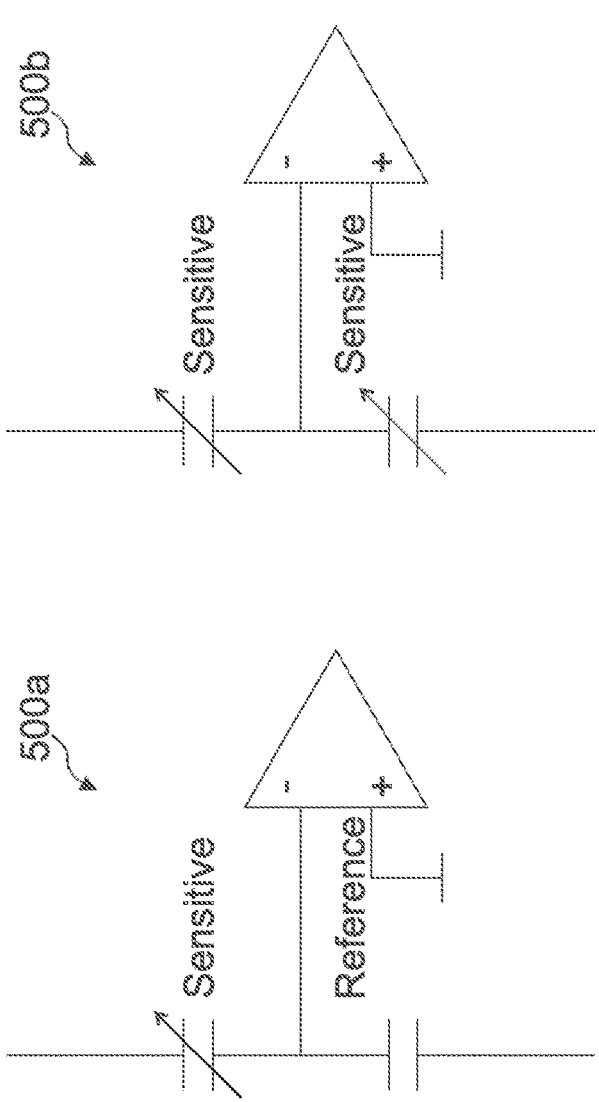
FIG. 5A shows a half-bridge configuration for a normal readout mode.
Figure 6A:
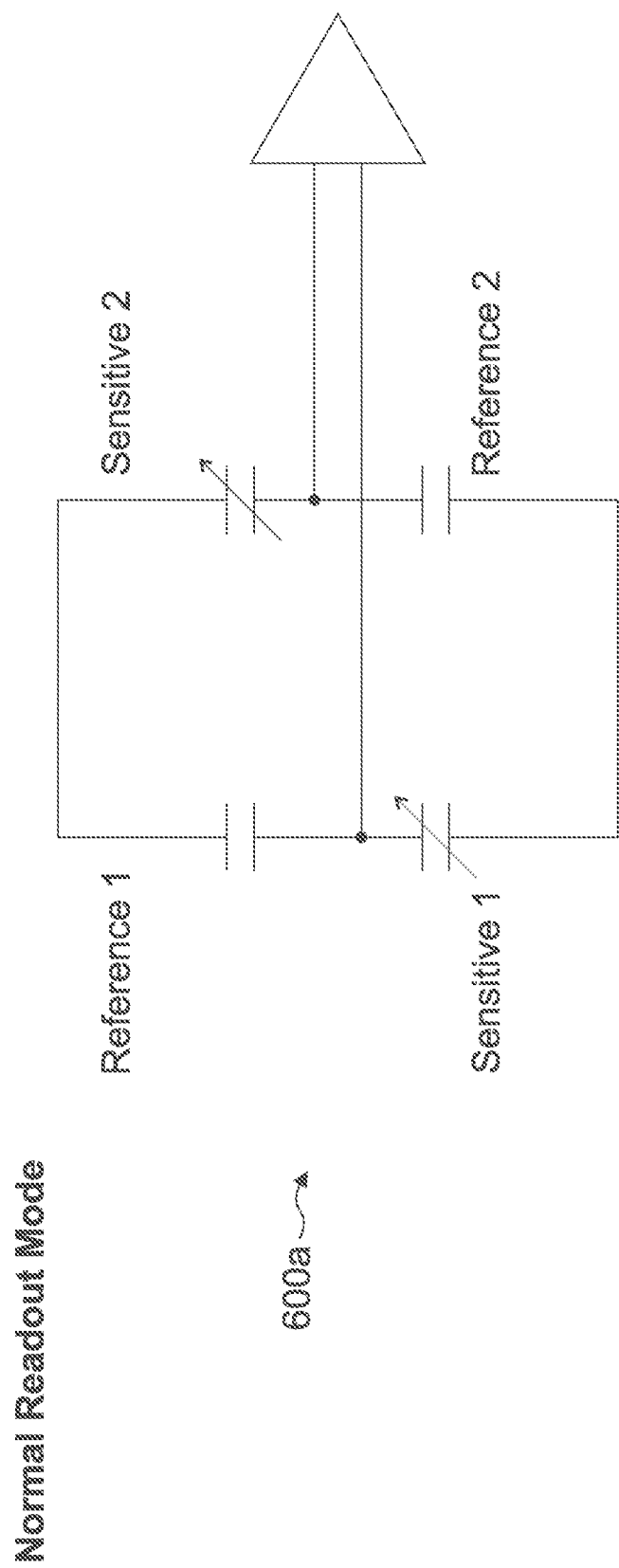
FIG. 6A shows a full-bridge configuration for a normal readout mode.
Figure 6B:
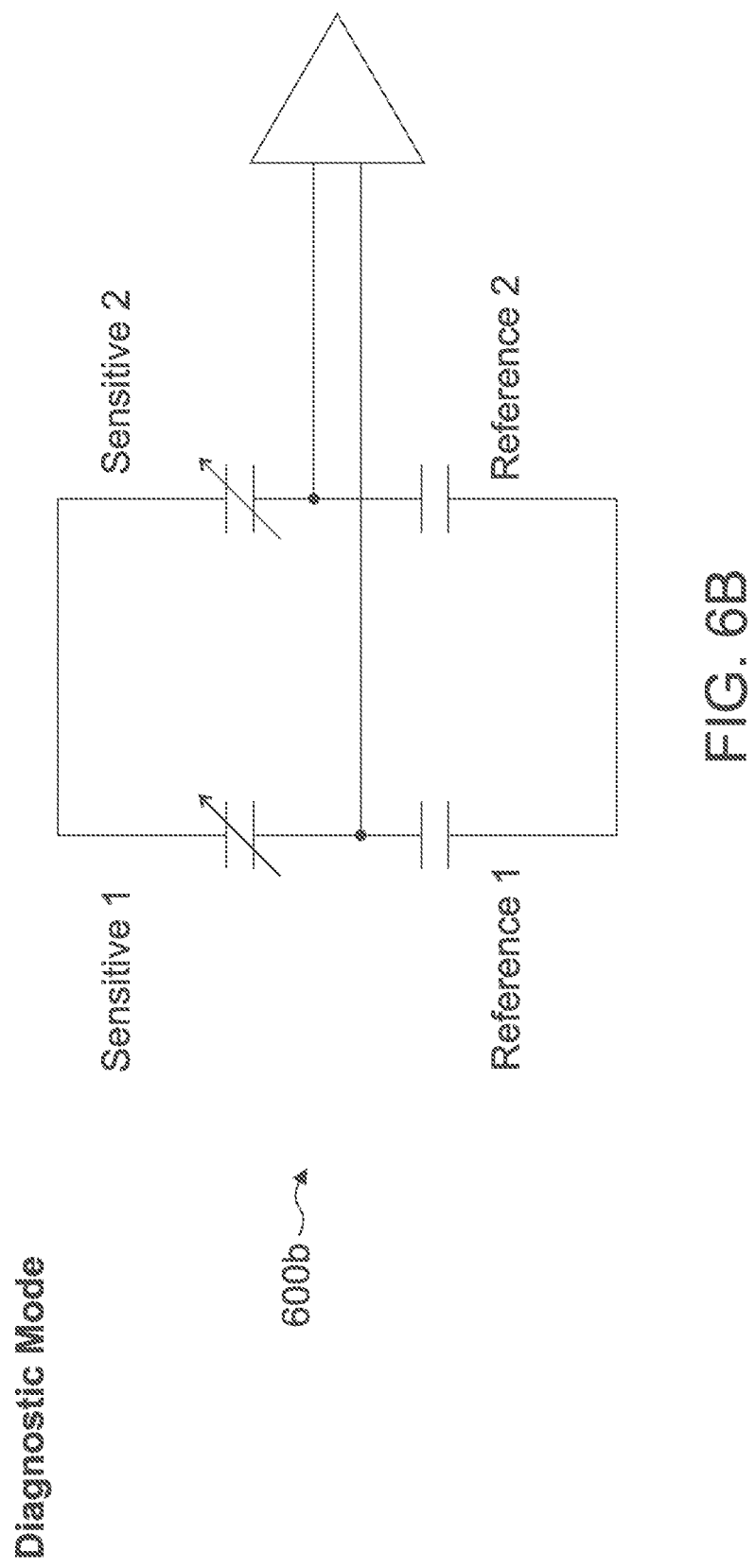
FIG. 6B shows a full-bridge configuration for a diagnostic mode.

Some electrical arrangements for the measurement units are shown in FIGS. 5A-5C and 6A-6B. FIGS. 5A-5C show three possible measurement modes using a variety of sensitive and reference cells in half-bridge configurations. FIGS. 6A-6B show two possible measurement modes in full-bridge configuration comprised of a combination of the various half-bridge configurations. It should be appreciated that although a number of possible electrical configurations are shown with respect to FIGS. 5A-5C and 6A-6B, this list is not intended to be exhaustive and numerous other variations (including non-bridge configurations) may be employed.

FIG. 5A shows a sensitive sensor cell and a reference sensor cell in half-bridge configuration. Since the reference cell is insensitive (or substantially less sensitive) to the measured quantity, the configuration of FIG. 5A returns a measured quantity (that is, the difference between the measured value of sensitive sensor cell and the reference cell, which returns a reference value). As previously described, this mode shall be referred to as the "normal readout mode" 500a.

FIG. 5B shows the same arrangement as FIG. 5A, except that both sensors are sensitive sensor cells. This mode returns the difference of the two sensitive cells; thus, this mode is a diagnostic mode. For clarity, we shall call this the "sensitive diagnostic mode" 500b.

FIG. 5C shows the same arrangement as FIGS. 5A and 5B, except that both sensors are reference sensor cells. This mode returns the difference of the two reference cells; as previously explained, this mode is also a diagnostic mode. To distinguish from the configuration of FIG. 5B, we shall call this the "reference diagnostic mode" 500c.

FIG. 5A-5C shows a variety of configurations using capacitive sensors, but the embodiments described are not meant to be restricted to capacitive sensors only. It should be appreciated that resistors, transistors, and piezoelectric sensors, among other sensors or sensing principles, may be used in similar configurations in lieu of capacitors. Thus, half-bridge resistive, piezoelectric, or transistor based configurations in "normal readout" or "diagnostic mode" are also possible.

The full-bridge configurations shown in FIG. 6A-6B are analogous to the half-bridge configurations of FIG. 5A-5C. FIG. 6A shows the "normal readout mode" 600a and FIG. 6B shows the "diagnostic mode" 600b. As will be readily understood by one of skill in the art, these modes work analogously to those described in connection with the half-bridge configurations of FIG. 5. FIG. 6 shows a variety of configurations using capacitive sensors, but, similar to FIG. 5, these embodiments are not meant to be restricted to capacitive sensors only. It should be appreciated that resistors, transistors, and piezoelectric sensors, among other sensors or sensing principles, may be used in similar configurations in lieu of capacitors. Thus, full-bridge resistive, piezoelectric, or transistor based configurations in "normal readout" or "diagnostic mode" are also possible.

The set of measurement units 10, 12 of the apparatus 100 may comprise half-bridge (500a, 500b, 500c) or full-bridge (600a, 600b) sensor cell type configurations. The sensor cells of the half-bridge configurations are selected from the group consisting of one reference cell and one sensitive cell (500a), two sensitive cells (500b), and two reference cells (500c), while the sensor cells of the full-bridge configurations comprise a combination of the sensor cells of two half-bridge configurations.

FIG. 7 shows a conventional approach to the physical arrangement of sensor cells to implement sensing and diagnostic modes. A large set of each sensor type (sensitive cells grouped as S1, sensitive cells grouped as S2, reference cells grouped as R1, and reference cells grouped as R2) are wired in parallel as shown in FIG. 7 (and analogous to FIG. 2, but with four groups of sensor elements). Under the conventional approach, the spacing 701 between elements of the same grouping is minimized, and thus, the environmental and other factors influencing any given set are homogenous. For example, environmental factors influencing two adjacent R1 cells would be very similar. However, the spacing 702 between different groupings is not small and the environmental factors influencing an S1 cell could be substantially different than the factors influencing an S2 cell, located elsewhere on the die. Thus, different groups of sensors may experience non-homogeneous factors which influence their readouts. Due to this arrangement, it is necessary to choose sensor elements which are far apart in order to effect all the measurement modes previously described.

In order to minimize the mismatch between readouts of the various sensors and measurement unit configurations described above, the spacing between sensor elements should be small. "Small" here means a distance compared to the dimensions of the full sensor set so as to ensure homogenous processing conditions and environmental factors, such that a powered ESD or package/tester stress upon the sensor elements influence the sensor cells in the same or very similar way. For example, "small" may mean that the spacing between individual sensor elements is less than 50 microns (or 25 microns or 10 microns) or that the gap between two sensor cells is less than the largest dimension (or smallest dimension) of the sensor cells. "Small" may also mean that the distance between the centroids of at least two intermixed sensor cells is X*square root A, where A is the area of the set of sensor cells and X is a multiplicative factor less than or equal to 0.25. "Small" may also mean that the area of the largest element in a measurement unit is smaller than A/16 (or A/8 or A/32).

FIG. 8 shows one approach to intermixing the sensor cells using a simplified rectangular arrangement. Instead of arranging the sensor cells of the four sensor elements S1, S2, R1, and R2, in their own individual sets as shown in FIG. 7, the sensor elements are intermixed with one another. The total number of sensor elements and the area covered by them remains the same; however, the distance between different cell types or groups is minimized to remove the influence of varying external (i.e. environmental) factors.

The spacing 801 between individual sensor elements is similar to the arrangement of FIG. 7. However, in contrast to FIG. 7, the spacing 802 between sensor elements of different groupings is also minimized (compare 802 with 702). Although a gap may exist between different sets of sensor elements, unlike the arrangement of FIG. 7, there is no requirement to select sensor elements with such a large gap between them. The intermixing arrangement provides for a number of sensor elements from every grouping with sufficiently close spacing 802 so that sensor elements which are far apart (and thus experience different influential factors) are not required to be chosen, although they can be.

Thus, in the simplified arrangement shown in FIG. 8, a quadratic, rectangular, even arrangement with small spacing with respect to both the centroids of the individual sensor elements as well as small spacing with respect to the area of the sensor set are achieved.

FIG. 9 shows an arrangement of sensor cells arranged in a hexagonal pattern, as opposed to the rectangular pattern of FIG. 8. This arrangement is analogous to the arrangement of FIG. 8, and the spacing 901 between individual sensor elements is similar to the spacing 801 of the rectangular arrangement. Similarly, the spacing 902 between sensor elements of different groupings is also minimized in the same manner as the spacing 802 of the rectangular arrangement. It should be appreciated that although a rectangular arrangement (and rectangular sensor cells) are shown with respect to FIG. 8, and a hexagonal arrangement (and hexagonal sensor cells) are shown with respect to FIG. 9, these shapes are drawn only for the clarity of the drawing. The sensor cells may be of any shape (circular, rectangular, hexagonal, irregular, etc.) and may be arranged in any arbitrary pattern (rectangular, triangular, hexagonal, etc.). Neither the shape of the sensor cells nor their arrangement are intended to be restricted to the embodiments shown.

Figure 10:
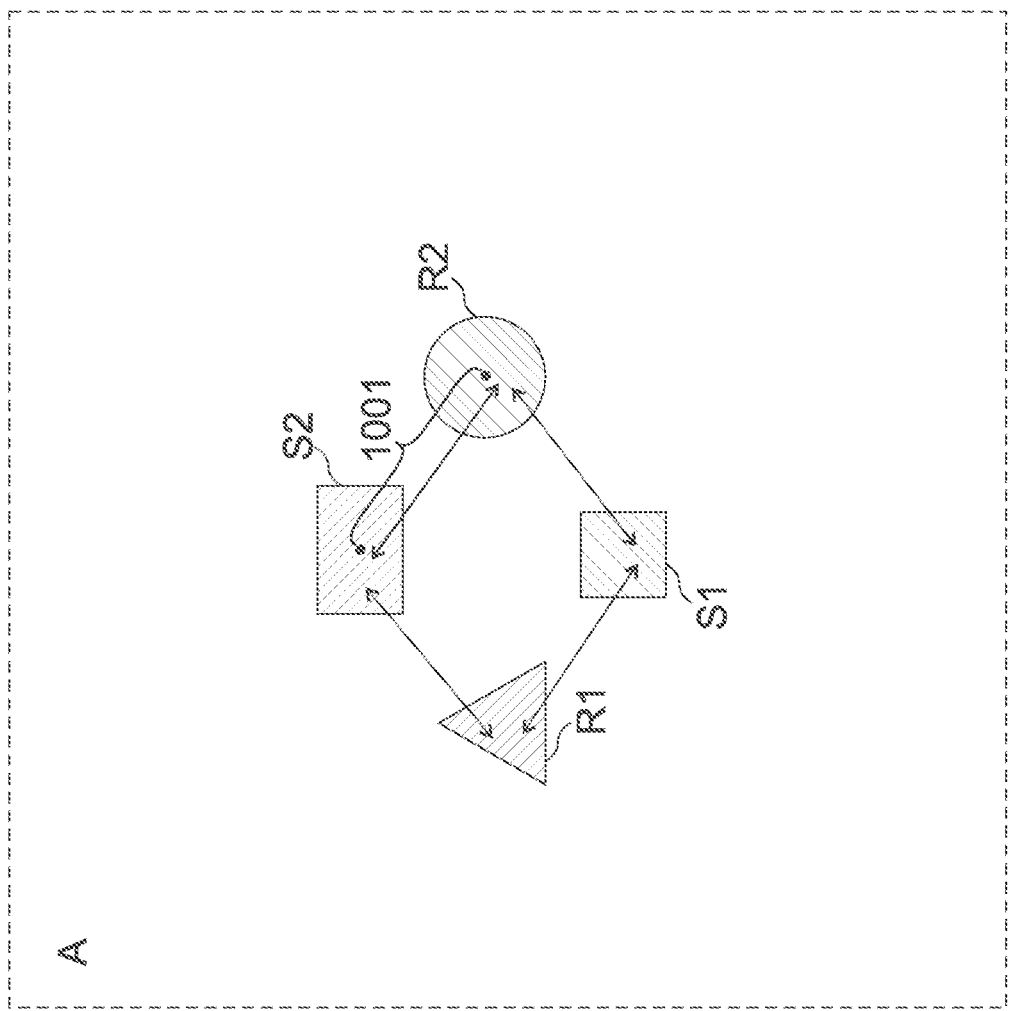
FIG. 10 shows an arbitrary arrangement of intermixing.

FIG. 10 shows a generalized arrangement of one set of the sensor arrangement of FIGS. 8 and 9. It should be appreciated that any arbitrary shape, symmetry, and spacing of sensor elements may be used as long as the spacing 1001 is small with respect to the centroids of the sensor elements and the area of the set of sensor elements. For example, any arrangement of two groups of sensitive sensor cells (S1 and S2) and two groups of reference sensor cells (R1 and R2) may be used as long as the largest centroid spacing 1001 between elements is smaller than 0.25*square root A or that the area of the largest element is smaller than A/16.

Furthermore, the sensor cell elements may have comparable capacitance. Both sensitive cell groups S1 and S2 may have the same (or different) shapes, the same (or different) capacitive size, and the same (or different) sensitivity to the measured quantity. Similarly, both reference cell groups R1 and R2 may have the same (or different) shapes, the same (or different) capacitive size, and the same (or different) sensitivity to the measured quantity. The sensitive cell groups S1 and S2 may have the same shape as the reference cell groups R1 and R2.

Figure 11:
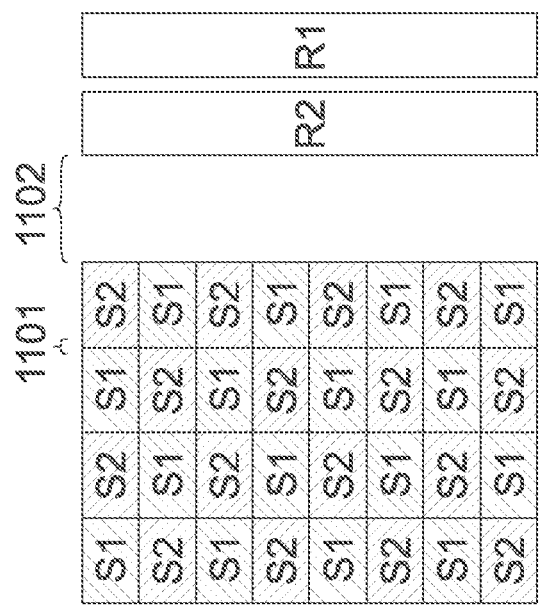
FIG. 11 shows an alternate arrangement of sensitive and reference cells.

FIG. 11 shows an alternative arrangement of intermixed sensor cells. Since the reference cells R1 and R2 are insensitive (or far less sensitive) to the measured quantity, they are generally not affected by varying environmental factors or external stress. Therefore, an arrangement intermixing the sensitive sensor cells S1 and S2 may still reduce the readout mismatch of these sensors (as they are influenced by environmental factors) while retaining the reference cells in a more conventional arrangement. It should be noted that the spacing requirements discussed in connection with FIGS. 7-10 should still be considered with respect to the sensitive sensor cells, as it is the small spacing which ensures homogeneity of the measured quantity. The spacing 1101 between sensitive sensor cells S1 and S2 is maintained, while the spacing 1102 between sensitive and reference cells is irrelevant since the reference cell is not influenced by environmental factors.

In the intermixing only implementations described above, all elements of a single group (S1, S2, R1, or R2) are connected and read together. One can select and compare the output signals of any such grouping of sensor cells or measurement unit configurations in order to obtain the measured quantity or to compare the readouts of various groupings (using the normal readout or diagnostic modes previously mentioned).

Another possible improvement consists of allowing independent readout of each sensor element. This structure of the MEMS has the benefit that a sub-part of it can also be a complete sensor structure. This means that, as shown in FIGS. 12-15 and explained in detail below, the MEMS can be organized into several areas that can be activated or deactivated independently. For example, basic bridge elements wired in parallel to form larger segments (used for intelligent sensing and screening) can be individually addressed and read. Wiring of segments may be either hard wired or configurable during testing or in the field. By controlling the voltages which command each area independently, segmentation can be implemented.

During the screening test, each element (or small group of elements) may be read separately. This allows the screening out of devices for which the drift of a single sensor element is an outlier. This approach is advantageous because, when the affected element is read, the readout given by the defect is the same as when the entire sensor is read. On the other hand, the readout given by the natural drifts will be smaller when reading a single element compared to the entire sensor. Thus, it is possible to localize defects in individual sensors.

Figure 12:
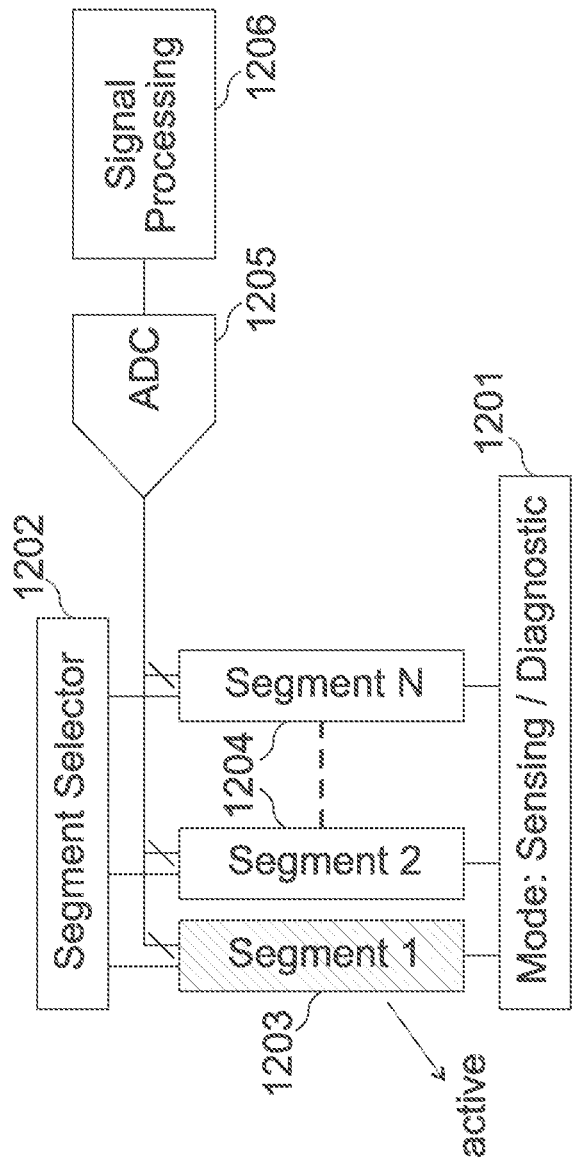
FIG. 12 shows a basic diagram for implementing segment selection.

FIG. 12 shows a basic diagram for implementing segmentation or segment selection. A mode selector 1201 determines which measurement mode is desired (such as a normal readout mode or diagnostic mode based on half or full bridge configurations). A segment selector 1202 activates only a desired segment (for example, by controlling the voltages which command each area). The sensor cells within only the selected segment 1203 are activated by the segment selector 1202, passing their signal through ADC 1205 and onto signal processing 1206. In this manner, the segment selector 1202 may activate any segment(s) corresponding to a subset of sensor cells and/or to a subset of the set of measurement units which can then be tested to determine their readout and/or to determine whether any of said subset of cells are intact or faulty. The subset of the set of measurement units may comprise units of the same sensor cell type configuration (i.e. half or full bridge). The remaining segments 1204 are not selected.

Figure 13:
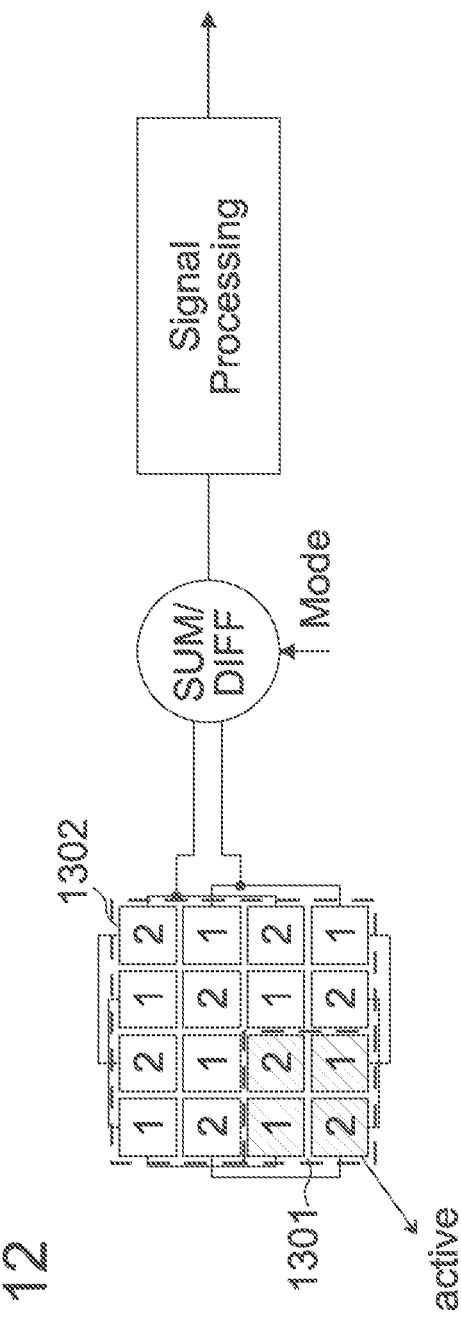
FIG. 13 shows a generalized layout for segment selection.

FIG. 13 shows a generalized concept of segmentation based on the principles shown in FIG. 4. Rather than selecting the entire grouping of sensors 1 and 2, the segment selector 1202 of FIG. 11 selects only a subset of these groupings 1301. The subset of chosen elements may retain the same sensor cell or measurement unit type configurations as those in the intermixing-only implementation, and measurements analogous may be carried out. However, in contrast to the intermixing-only implementation shown in FIGS. 4-11, segmentation allows for the selected cells 1301 to be tested (or excluded from testing 1302) which can then be commonly addressed or read. Segments may be chosen based on a variety of arrangements relative to each other, particularly those with certain symmetries, such as: point, axis, interleaved, rectangular, hexagonal, or other regular or irregular patterns. The size of the segments may also be varied allowing for relative comparison of segments, comparative diagnostic functions, redundancy schemes, or adapted calibrations. Finally, just as in the intermixing-only configuration, the components of segments may be hard-wired or configurable during testing or in the field.

The means for 120 selecting output signals of sensor cells of the arrangement may be configured to select at least one segment 1203, 1301. A segment may comprise a subset 1203, 1301 of the set of measurement units (the total of 1203 and 1204 or 1301 and 1302) of the same sensor cell type configuration. The means for 130 determining a measured quantity or determining an intact sensor cell may be configured to measure 1206 the sensor cells using at least one segment. Thus, rather than using the entire set of sensor cells, a subset may be chosen (i.e. a single segment) and only the cells within this segment may be measured. This allows the removal of unwanted cells from the measurement and the localization of measured quantities.

On the other hand, the means for 130 determining a measured quantity or determining an intact sensor cell may be configured to compare 1206 measurements obtained using multiple segments (i.e. activating Segment 2 in addition to Segment 1 as shown in FIG. 12). The means for 130 determining a measured quantity or determining an intact sensor cell may be configured to compare the output signals of one or more segments to determine information related to a natural drift of the sensor cells of the one or more segments. Whereas the drift of a single sensor may be obscured by others in the segment; by comparing the segment with another, a determination of the variance in the drift may be achieved. In other words, the means for 130 determining a measured quantity or determining an intact sensor cell may further comprise means for comparing output signals of one or more segments to determine information related to a natural drift of the sensor cells of the one or more segments.

By localizing the measurements, the means for 130 determining a measured quantity or determining an intact sensor cell may further comprise means for determining information related to a drift of at least one sensor cell of the arrangement of sensor cells.

Once the drift information of a sensor cell is determined, the means for 130 determining a measured quantity or determining an intact sensor cell may further comprise means for comparing the information related to the drift of the sensor cell to an estimated drift information. The estimated drift information may be based on a diagnostic drift measurement. Furthermore, the diagnostic drift measurement may be a calibrated and/or temperature compensated measurement.

Figure 14:
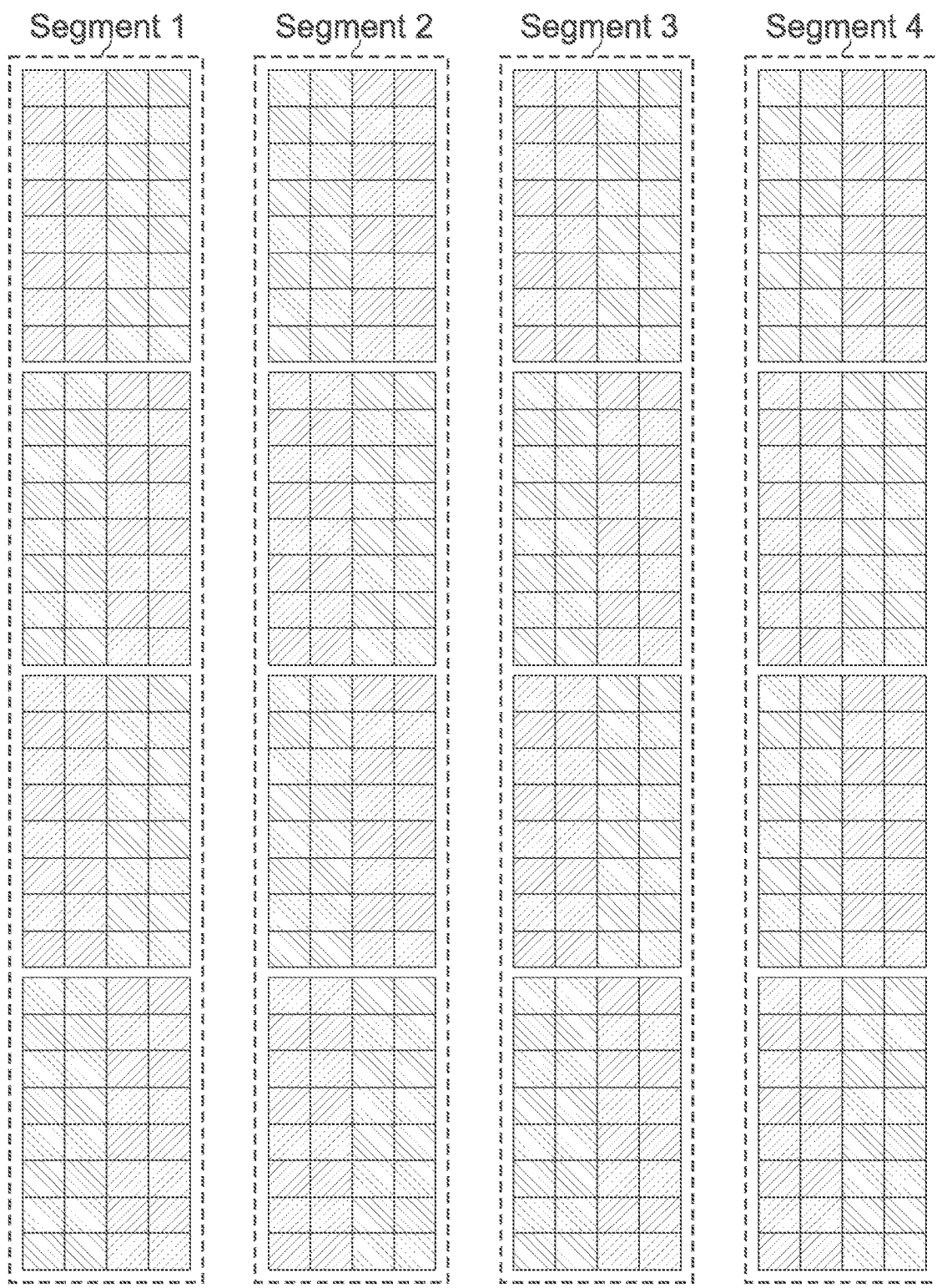
FIG. 14 shows an actual implementation of intermixing and segmentation.

FIG. 14 shows a layout concept for implementation of segmentation including intermixing of the sensor cells. Sensitive cells (S1 and S2) and reference cells (R1 and R2) are intermixed as previously described and to minimize spacing between the cells. Using the intermixing-only approach, measurements can be made using the entire grouping of these sensor cells, for example by forming various measurement unit configurations comprised of all the sensor cells in the set. If one particular cell of the set is defective, this defect may be obscured across the aggregation of all sensor cells of the same group. In this situation, segmentation is advantageous.

Sub-sets may be activated as labeled by segments 1-4 (it should be appreciated that many segment configurations are possible; the simplified scenario of FIG. 14 is shown for clarity only). Each segment may then be distributed into a subset of measurement units and measurements may be obtained and compared in an analogous way to measurements of the entire set, except limited to one segment at a time. Additionally, or alternatively, multiple segments may be activated simultaneously and their measurements may be compared as well, enabling the detection of defects or drifts within one segment based on a comparison with another (non-defective) segment. The segmentation may be altered as needed, so that measurements can be made using only a particular subset of cells; thus excluding certain cells in order to achieve a more localized measurement. If one particular cell is defective, it can be included (or excluded) from comparative measurements and specifically tested.

Figure 15:
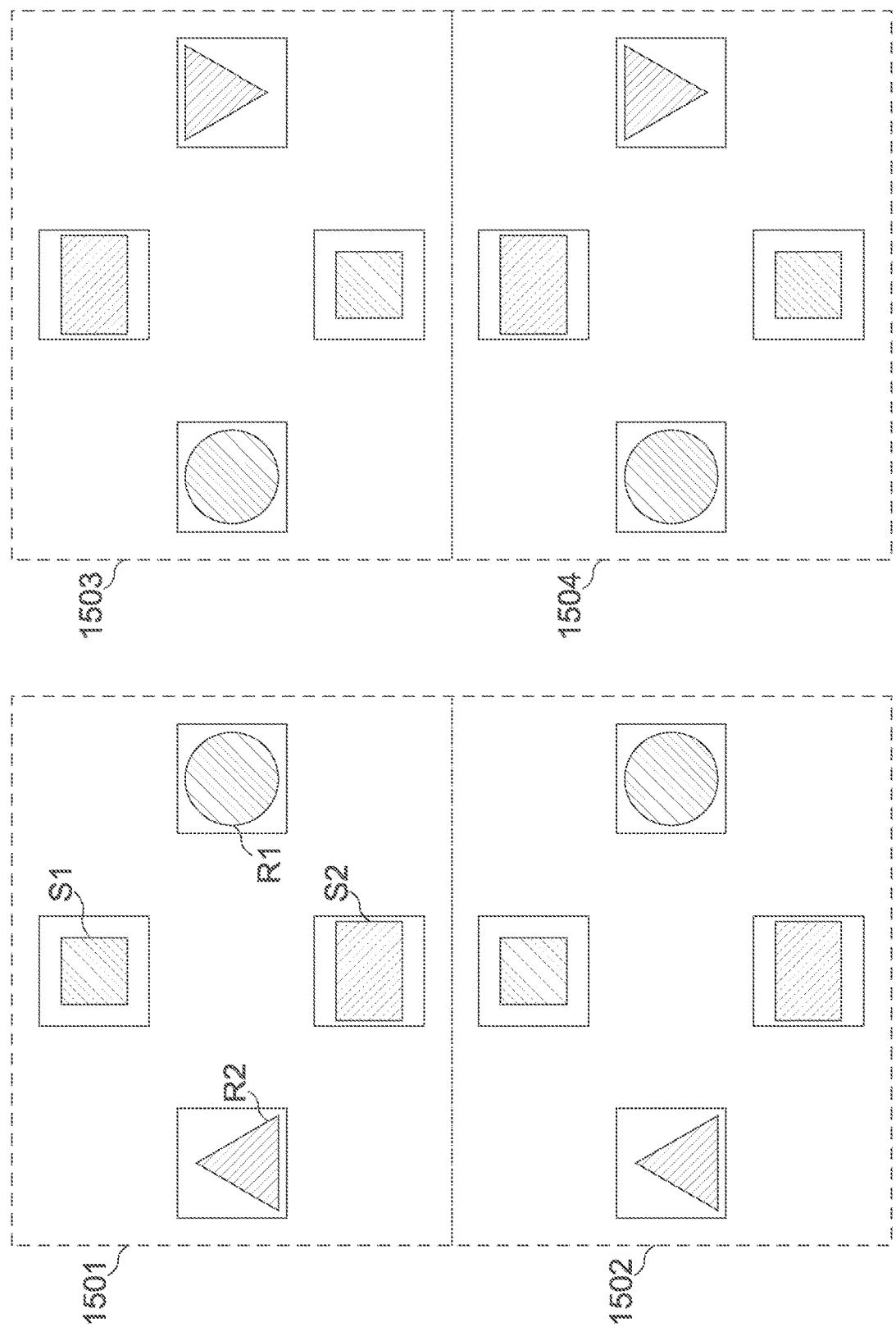
FIG. 15 shows an arbitrary arrangement for segmentation.

FIG. 15 shows an arbitrary arrangement of units within a single segment analogous to the layout of FIG. 10, with each shape representing one cell of each group (S1, S2, R1, and R2). A single segment may be formed of an arbitrary arrangement of units based on translations, rotations, reflections, or any combination thereof at a centroid of the configuration. Reflections may be point, line, or mirror reflections. FIG. 15 illustrates 4 units: 1501, 1502 (translation of 1501), 1503 (line reflection of 1501), and 1504 (translation and line reflection of 1501). However, care must be taken to ensure that the spacing of the individual elements is still small with respect to the area of the set. In particular, the spacing of the centroids of the sensor cells should retain the characteristics previously described, such as being less than (0.25*square root A). Similarly, multiple segments may be formed and compared with one another.

Using the previously discussed normal readout and diagnostic modes, it is possible to detect severe damage of the sensor. It may be further beneficial to be capable of detecting deviations smaller than complete damage. In this sense, the diagnostic modes should be capable of detecting drifts in the normal readout (due to defects) that are large enough to violate the specification (within a tolerance). This means that a predictable correlation between the drift in the diagnostic readout and the drift in the normal readout is desired.

In order to improve such a correlation between the diagnostic and normal readout modes, the diagnostic mode can be calibrated and compensated for variations with temperature and the sensed quantity and scaled in the same way as the normal readout (sensor sensitivity scaling). This type of calibration has the advantage that the drift in the diagnostic readout will be a direct indicator of the amount of measured error that the sensor has when measuring the physical quantity.

Figure 16:
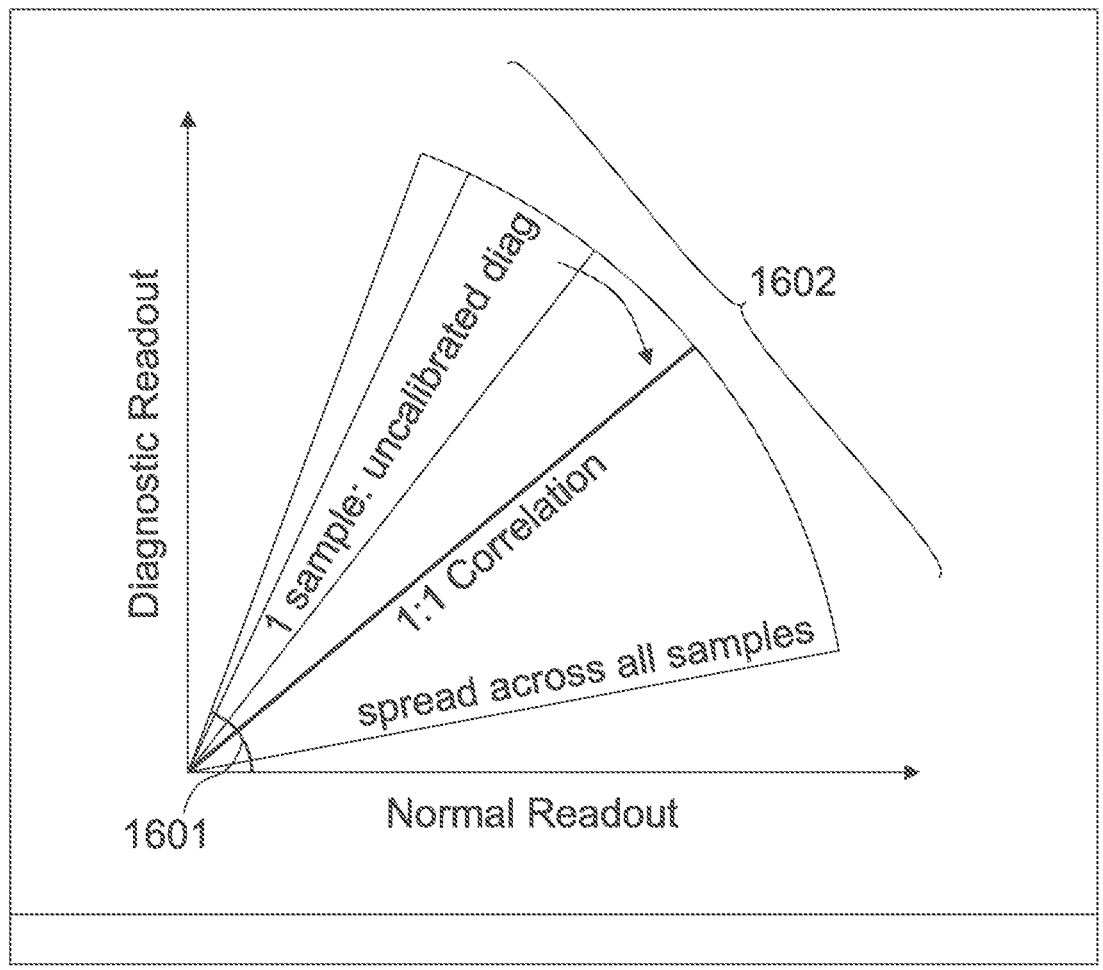
FIG. 16 shows a correlation between the normal and diagnostic readouts with scaling.

FIG. 16 illustrates the correlation between sensitivity scaling and the normal and diagnostic readout modes. As sensitivity is increased, so too is the spread across all samples. At low sensitivity 1601, the spread is minimal, thus making it difficult to detect deviations. However, as sensitivity is increased 1602, so too does the spread. By calibrating, the correlation of diagnostic with normal readout increases diagnostic coverage, allowing the diagnostic to replace more conventional tests (such as a system-level ambient pressure test in the case of pressure sensors as used in car airbags).

By implementing intermixing and segmentation as described above, it is possible to measure the normal readout and diagnostic modes of a variety of different sensor cell arrangements, allowing one to more accurately detect defects or variations beyond acceptable tolerances. In contrast to the conventional method, when a mismatch is detected, segmentation allows one to further hone in on certain areas or sensor elements in order to detect individual or localized defects both on the production line and in the field.

After the plurality of intact sensor cells is determined, their signals may be combined and output through a single source to generate a more accurate reading which is less affected by environmental factors or other stress. As time passes, these cells may be tested again (as desired in accordance with safety specifications or other requirements) in order to ensure that no time-dependent or in-the-field defects arise.

Should a faulty cell be detected at some time after initial testing (t>0), the configurable wiring and segmentation implementations allow for the defective cell to be deselected. By doing so, the arrangement of remaining (intact) cells will continue to provide a meaningful readout and remain within safety specifications without being affected by the faulty readout of the defective cells.

Thus, after the plurality of intact sensor cells has been determined, the means for 120 selecting sensor cells may deselect a sensor cell from the plurality of intact sensor cells. Additionally, or alternatively, the means for 120 selecting sensor cells may deselect a measurement unit containing the sensor cell from the set of measurement units, if comparing the output signal of the sensor cell indicates the sensor cell to be defective.

Once a defective cell is detected, the cell, or the measurement unit of which it is a part of, may be deselected. Due to the configurability of segmentation, it is possible to select a replacement cell (or replacement measurement unit of the same configuration) so that the symmetry of the selection is maintained. In this situation, care should be taken to maintain the spacing requirements previously mentioned. However, in the case that the only available replacement cell violates the small spacing requirements, it may still be chosen with the knowledge that it may influence the aggregate readouts of the selected set. As long as a sufficient number of intact cells remain with sufficiently close spacing, the outlier cell's influence on the aggregate reading will be minimal.

Thus, the means for 120 selecting output signals of sensor cells of the arrangement may select spare sensor cells to replace any deselected sensor cells. Additionally, or alternatively, the means for 120 selecting output signals of sensor cells of the arrangement may select spare measurement units to replace any deselected measurement units.

Figure 17:
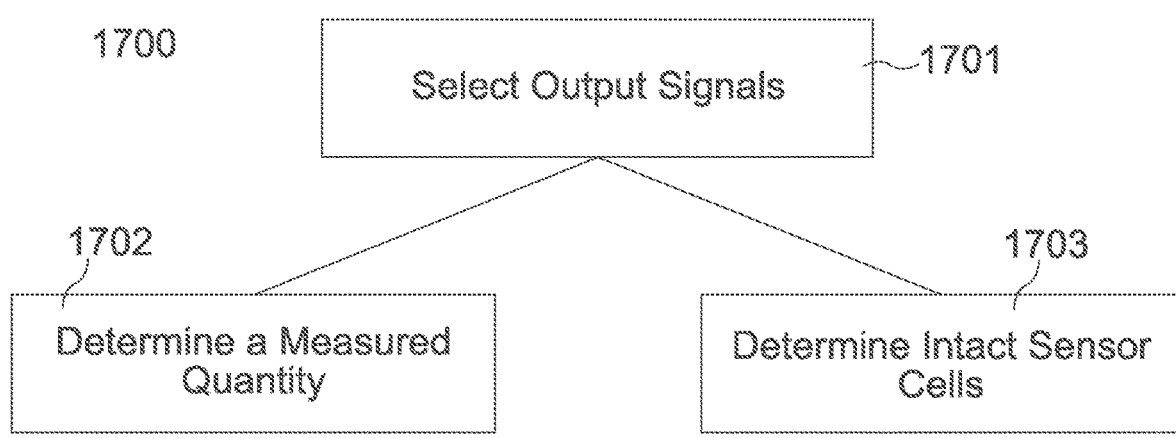
FIG. 17 shows a method for comparing the output of sensor cells.

FIG. 17 shows a flowchart of a method for comparing the output of sensor cells (such as the arrangement shown in relation to the apparatus of FIG. 1). The method 1700 comprises selecting output signals 1701 of sensor cells of the arrangement and determining a measured quantity 1702 or determining an intact sensor cell 1703 by comparing output signals of different measurement units. The selection of the output signals 1701 may be accomplished through any of the variety of means mentioned above: for example, the entire set of sensor cell groupings may be chosen, one particular segment of sensor cells may be chosen, or multiple different segments of sensor cells may be chosen. Once the output signals of the sensor cells have been selected 1701, they can then be read in order to determine a measured quantity 1702 (such as the normal or diagnostic readouts). Alternatively, they can be compared to one another in order to determine intact sensor cells 1703, such as by comparing the entire grouping, one segment, or a comparison of multiple segments.

Normally, during an ESD test of the sensor elements, a corona discharge couples itself parasitically to the sensors causing an EMP and particle flow that causes electric charge variations in the MEMS which results in a measured (pressure) signal error. By using an arrangement of smaller intermixed cells rather than the conventional approach using two large sensors, a metal mesh may be placed in the spacing between the sensor cell elements, thus reducing or negating ESD residual effects. In addition, intermixing solves this problem by several mechanisms: the coupling capacitances of the sensors become equalized; the charge particle fluxes from corona to the surface of the sensors becomes equalized; and the electric charges induced in the sensors by the asymmetric prepolarization charge (from previous discharges) also becomes equalized.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic sets ((F)PLAs) or (field) programmable gate sets ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate set (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCES

100 Apparatus for comparing the output of sensor cells
110 Set of measurement units
10, 12, 1N Measurement units
10a, 10b, 10n Sensor cells
12a, 12b, 12n Sensor cells
120 Means for selecting or deselecting sensor cells
130 Means for determining a measured quantity or means for determining intact sensor cells
140 Sensor output signal
150 Metal mesh
500a Half-bridge configuration in normal readout mode
500b Half-bridge configuration in sensitive diagnostic mode
500c Half-bridge configuration in reference diagnostic mode
600a Full-bridge configuration in normal readout mode
600b Full-bridge configuration in diagnostic mode
701 Spacing between sensor elements of the same group
702 Spacing between sensor elements of different groups
801 Spacing between sensor elements of the same group
802 Spacing between sensor elements of different groups
901 Spacing between sensor elements of the same group
902 Spacing between sensor elements of different groups
1001 Spacing between sensor elements of different groups
1101 Spacing between sensitive sensor elements
1102 Spacing between sensitive and reference elements
1201 Mode selector
1202 Segment selector
1203 Actively selected segment
1204 Non-selected segments
1205 ADC
1206 Signal processor
1301 Actively selected segment
1302 Non-selected segments 1501 Initial segment selection
1502 Translation of segment 1501
1503 Reflection of segment 1501
1504 Translation and reflection of segment 1501
1601 Low-scaled spread
1602 High-scaled spread
1700 Method
1701 Selection of output signals
1702 Determination of a measured quantity
1703 Determination of intact sensor cells
A Area of the arrangement of sensor cells
S1, S2 Sensitive sensor cells
R1, R2 Reference sensor cells

What is claimed is:

1. An apparatus configured to compare outputs of sensor cells in an arrangement of sensor cells arranged in an area, comprising:
a set of at least two measurement units, wherein each measurement unit comprises at least two sensor cells of the sensor cells in the arrangement of sensor cells, wherein at least one sensor cell in the arrangement of sensor cells comprises a sensitive sensor cell that is sensitive with respect to a measured quantity and generates an output signal based on the measured quantity, wherein the sensor cells are intermixed with each other in the area;
selector circuitry configured to select output signals of the sensor cells in the arrangement of sensor cells, the selected output signals including output signals from different measurement units; and
processing circuitry configured to determine the measured quantity by comparing the selected output signals of the different measurement units or determine an intact sensor cell by comparing the selected output signals of the different measurement units,
wherein the set of the at least two measurement units comprises measurement bridges, wherein the measurement bridges comprise sensor cell type configurations including half-bridge sensor cell type configurations or full-bridge sensor cell type configurations,
wherein the sensor cells of the half-bridge configurations are selected from the group consisting of one reference sensor cell and one sensitive sensor cell, two sensitive sensor cells, and two reference sensor cells,
wherein the sensor cells of the full-bridge configurations comprise a combination of the sensor cells of two half-bridge configurations,
wherein the selector circuitry is configured to select at least one segment, wherein a segment comprises a subset of a set of measurement bridges of a same sensor cell type configuration, and
wherein the processing circuitry is configured to measure the sensor cells included in the at least one selected segment.

2. The apparatus of claim 1, wherein the arrangement of sensor cells comprises at least a first cell type, which is a reference sensor cell, and at least a second cell type, which is the sensitive sensor cell, wherein the reference sensor cell has a different sensitivity than the sensitive sensor cell with respect to the measured quantity.

3. The apparatus of claim 1, wherein the processing circuitry is configured to compare measurements obtained using multiple segments.

4. The apparatus of claim 3, wherein a first segment is a translation, rotation, reflection, or combination thereof of a second segment relative to a centroid.

5. The apparatus of claim 4, wherein the reflection is a point, line, or mirror reflection.

6. The apparatus of claim 3, wherein the processing circuitry is configured to compare the selected output signals of one or more segments to determine information related to a natural drift of the sensor cells of the one or more segments.

7. The apparatus of claim 6, wherein the processing circuitry is configured to compare the information related to the drift to an estimated drift information, and estimate the estimated drift information based on a diagnostic drift measurement.

8. The apparatus of claim 7, wherein the diagnostic drift measurement is a calibrated and/or temperature compensated measurement.

9. The apparatus of claim 3, wherein the processing circuitry is configured to determine information related to a drift of at least one sensor cell in the arrangement of sensor cells.

10. The apparatus of claim 1, wherein the processing circuitry is further configured to:
determine a plurality of intact sensor cells; and
combine output signals of the plurality of the intact sensor cells to obtain a combined sensor output signal.

11. The apparatus of claim 10, wherein after the plurality of intact sensor cells have been determined, the selector circuitry is configured to identify a defective sensor cell, and deselect the defective sensor cell or deselect a measurement unit that contains the defective sensor cell.

12. The apparatus of claim 11, wherein the selector circuitry is configured to select at least one spare sensor cell to replace the deselected sensor cell or selecting a spare measurement unit to replace the deselected measurement unit.

13. The apparatus of claim 1, further comprising a metal mesh in spaces between the sensor cells.

14. The apparatus of claim 1, wherein a distance between centroids of at least two intermixed sensor cells is less than 0.25 multiplied by a square root of the area.

15. The apparatus of claim 1, wherein a gap between at least two sensor cells in the arrangement of sensor cells is less than the largest dimension of the sensor cells.

16. The apparatus of claim 1, wherein a gap between at least two sensor cells in the arrangement of sensor cells is less than 50 microns.

17. A method for comparing outputs of sensor cells in an arrangement of sensor cells arranged in an area, wherein a set of at least two measurement units is provided, wherein each measurement unit comprises at least two sensor cells of the sensor cells in the arrangement of sensor cells, wherein at least one sensor cell in the arrangement of sensor cells comprises a sensitive sensor cell that is sensitive with respect to a measured quantity and generates an output signal based on the measured quantity, wherein the sensor cells are intermixed with each other in the area, the method comprising:
selecting output signals of the sensor cells in the arrangement of sensor cells, the selected output signals including output signals from different measurement units; and
determining a measured quantity by comparing the selected output signals of the different measurement units or determining an intact sensor cell by comparing the selected output signals of the different measurement units,
wherein the set of the at least two measurement units comprises measurement bridges, wherein the measurement bridges comprise sensor cell type configurations including half-bridge sensor cell type configurations or full-bridge sensor cell type configurations, wherein the sensor cells of the half-bridge configurations are selected from the group consisting of one reference sensor cell and one sensitive sensor cell, two sensitive sensor cells, and two reference sensor cells, and wherein the sensor cells of the full-bridge configurations comprise a combination of the sensor cells of two half-bridge configurations, wherein selecting output signals comprises selecting at least one segment, wherein a segment comprises a subset of a set of measurement bridges of a same sensor cell type configuration, and measuring the sensor cells included in the at least one selected segment.

18. A non-transitory computer readable recording medium having recorded thereon a computer program having a program code configured to perform the method of claim 17 when the computer program is executed on a processor, a computer, or programmable hardware.

19. An apparatus configured to compare outputs of sensor cells in an arrangement of sensor cells arranged in an area, comprising:

a set of at least two measurement units including a first measurement unit and a second measurement unit, wherein each measurement unit comprises at least two sensor cells, wherein at least one sensor cell in the arrangement of sensor cells comprises a sensitive sensor cell that is sensitive with respect to a measured quantity and generates an output signal based on the measured quantity, wherein the at least two sensor cells of the first measurement unit are intermixed with the at least two sensor cells of the second measurement unit in the area to form an array of intermixed sensor cells;

selector circuitry configured to select a first output signal of the at least two sensor cells of the first measurement unit and select a second output signal of the at least two sensor cells of the second measurement unit for simultaneous synchronous output; and processing circuitry configured to determine the measured quantity by comparing the first and the second output signals or determine that an evaluated sensor cell is an intact sensor cell by comparing the first and the second output signals, wherein the intact sensor cell is a sensor cell that is operating normally, wherein the set of the at least two measurement units comprises measurement bridges, wherein the measurement bridges comprise sensor cell type configurations including half-bridge sensor cell type configurations or full-bridge sensor cell type configurations, wherein the sensor cells of the half-bridge configurations are selected from the group consisting of one reference sensor cell and one sensitive sensor cell, two sensitive sensor cells, and two reference sensor cells, and wherein the sensor cells of the full-bridge configurations comprise a combination of the sensor cells of two half-bridge configurations, wherein the selector circuitry is configured to select at least one segment, wherein a segment comprises a subset of a set of measurement bridges of a same sensor cell type configuration, and wherein the processing circuitry is configured to measure the sensor cells included in the at least one selected segment.

20. The apparatus of claim 19, wherein comparing the first and the second output signals includes generating a difference value between the first and the second output signals, and the processing circuit is configured to determine the measured quantity or determine the intact sensor cell based on the difference value.

21. The apparatus of claim 19, wherein the first output signal is representative of a difference between two sensor cells of the first measurement unit and second output signal is representative of a difference between two sensor cells of the second measurement unit.

22. The apparatus of claim 19, wherein:

the processing circuit is configured to confirm a plurality of intact sensor cells, the selector circuitry configured to select the output signals of the plurality of intact sensor cells for synchronous output, and the processing circuit is configured to combine the output signals of the plurality of intact sensor cells that are synchronously output to generate a combined output signal.

23. The apparatus of claim 22, wherein the selector circuitry is configured to deselect defective sensor cells from the processing circuitry.

24. The apparatus of claim 19, wherein:

the at least two sensor cells of the first measurement unit include a first plurality of sensitive sensor cells that are each sensitive with respect to the measured quantity and each generate an output signal based on the measured quantity and a first plurality of reference sensor cells that are each substantially insensitive with respect to the measured quantity and each generate an output signal substantially independent from the measured quantity, and the at least two sensor cells of the second measurement unit include a second plurality of sensitive sensor cells that are each sensitive with respect to the measured quantity and each generate an output signal based on the measured quantity and a second plurality of reference sensor cells that are each substantially insensitive with respect to the measured quantity and each generate an output signal substantially independent from the measured quantity.

25. An apparatus, comprising:

an arrangement of sensor cells including a plurality of sensitive sensor cells that are each sensitive with respect to a measured quantity and each generate an output signal based on the measured quantity and a plurality of reference sensor cells that are each substantially insensitive with respect to the measured quantity and each generate an output signal substantially independent from the measured quantity;

selector circuitry configured to selectively couple the arrangement of sensor cells into different group configurations, including a first group configuration of at least two sensor cells and a second group configuration of at least two sensor cells;

processing circuitry comprising a comparator circuit that is selectively coupled via the selector circuitry to either the first group configuration of at least two sensor cells or to the second group configuration of at least two sensor cells to receive at least one first output signal or at least one second output signal, respectively, wherein the comparator circuit is configured to receive the at least one first output signal from the first group configuration of at least two sensor cells and generate a first comparator output signal based on the at least one first output signal, wherein the comparator circuit is configured to receive the at least one second output signal from the second group configuration of at least two sensor cells and generate a second comparator output signal based on the at least one second output signal, and wherein the processing circuitry is configured to determine the measured quantity based on the first comparator output signal and determine whether a sensor cell of the second group configuration of at least two sensor cells is intact based the second comparator output signal.

* * * * *